(12) United States Patent
Noguchi et al.

(10) Patent No.: US 6,751,408 B2
(45) Date of Patent: Jun. 15, 2004

(54) LENS-FITTED PHOTO FILM UNIT AND METHOD FOR REUSING THE SAME

(75) Inventors: Osamu Noguchi, Kanagawa (JP); Shinichiro Okada, Kanagawa (JP); Kazuhito Iwase, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 67 days.

(21) Appl. No.: 10/266,633

(22) Filed: Oct. 9, 2002

(65) Prior Publication Data

US 2003/0068163 A1 Apr. 10, 2003

(30) Foreign Application Priority Data

Oct. 9, 2001 (JP) .......................... 2001-311904

(51) Int. Cl.[7] .............................. G03B 17/02; G03B 1/00
(52) U.S. Cl. ............................ 396/6; 396/411; 396/535
(58) Field of Search ........................... 396/6, 395, 396, 396/411, 413, 535

(56) References Cited

U.S. PATENT DOCUMENTS

| 5,646,712 A | 7/1997 | Solomon et al. ............. 396/535 |
| 6,233,402 B1 * | 5/2001 | Solomon et al. ............... 396/6 |
| 6,263,159 B1 * | 7/2001 | Boyd et al. ..................... 396/6 |

FOREIGN PATENT DOCUMENTS

JP          07-120883          5/1995

* cited by examiner

*Primary Examiner*—Christopher Mahoney
(74) *Attorney, Agent, or Firm*—Young & Thompson

(57) ABSTRACT

An anti-reverse claw is in mesh with a winding dial of a lens-fitted photo film unit. The anti-reverse claw has a pair of welded pieces. The welded pieces go behind a rear cover of the lens-fitted photo film through a pair of holes formed in the rear cover. After assembling, a welding head is applied to the rear side of the rear cover to apply heat. The welded pieces and a separation plate are melted and mixed together, so that the anti-reverse claw is firmly fixed to the rear cover.

16 Claims, 10 Drawing Sheets

LENS-FITTED PHOTO FILM UNIT AND METHOD FOR REUSING THE SAME

BACKGROUND OF THE INVENTION

1. Field of the Invention

The present invention relates to a lens-fitted photo film unit with a mechanism to prevent improper replacement of a photo film cartridge. Moreover, the present invention relates to a method for reusing a lens-fitted photo film unit with such mechanism.

2. Description Related to the Prior Art

A lens-fitted photo film unit, in which an unexposed photo filmstrip is preloaded and a simple photographic mechanism is provided, is available for sale in the market. After use, the lens-fitted photo film unit is collected by a manufacturer and disassembled into components for reuse.

Recently, some lens-fitted photo film units in the market are manufactured by loading an unexposed photo film cartridge improperly into a used film unit. As a result of improper examination or lack of repair, such improper lens-fitted photo film unit causes more trouble than a properly fitted reused photo film unit. Since this kind of trouble causes lens-fitted photo film units to be less reliable, a conventional lens-fitted photo film unit is incorporated mechanisms to prevent improper reuse.

For instance, it is possible to prevent improper reuse by fixing a rear cover, removed in film replacement, to a main body firmly by ultrasonic welding. Moreover, JPA 7-120883 discloses a lens-fitted photo film unit in which an anti-reverse claw is broken when the lens-fitted photo film unit is disassembled. The anti-reverse claw is in mesh from behind with an engaging claw that is formed with the rear cover. When the rear cover is forcibly removed, the engaging claw pulls the anti-reverse claw causing it to be deformed or broken.

The above-mentioned lens-fitted photo film unit, however, has a disadvantage in that the film unit is easily disassembled by cutting the welded portion with an ultrasonic cutter or the like. Moreover, the mechanism disclosed in JPA 7-120883 is not effective to prevent the improper cartridge replacement when the claws are not engaged firmly. In these cases, it is possible to prevent improper cartridge replacement effectively by having strict size management. Since the strict size management causes increase in manufacturing cost, it is not preferable for low-price lens-fitted photo film unit.

SUMMARY OF THE INVENTION

An object of the present invention is to provide a lens-fitted photo film unit with a mechanism to prevent improper cartridge replacement effectively at a low price.

Another object of the present invention is to provide a method for reusing the lens-fitted photo film unit with such mechanism.

To achieve the above objects, the lens-fitted photo film unit of the present invention includes an anti-reverse claw integrated with the base portion, and a welded portion integrated with said anti-reverse claw. The anti-reverse claw being is engaged with the winding dial to prevent the reverse rotation of the winding dial. The welded portion is welded to the rear cover, so that the anti-reverse claw is broken when the rear cover is forcibly separated from the base portion.

In a preferred embodiment, the welded portion has two welded pieces protruded rearward of the rear cover through corresponding openings in the rear cover separated by a separation plate. The welded pieces are welded to the rear cover together with the separation plate. The opening of the rear cover is surrounded by a recess formed on a rear surface of the rear cover, so that the welded pieces are melted and spread in the recess.

In a preferred embodiment, second welded portion is provided on a light-shielding rib that is integrated with the rear side of the base portion. The second welded portion projects through a second opening formed in the rear cover, and welded to the rear cover to fix the light-shielding rib firmly to the base portion.

The lens-fitted photo film unit of the present invention is reused by welding a new anti-reverse claw to said lens-fitted photo film unit, so that the new anti-reverse claw engages the winding dial to prevent the reverse rotation of the winding dial. After separation of the rear cover from the base portion, the anti-reverse claw is broken and stuck on the rear cover. The anti-reverse claw on the rear cover is removed and the rear cover is smoothed. After the jointed surface of the base portion is smoothed, a new anti-reverse claw is weld to the base portion and the rear cover.

The broken anti-reverse claw may be reused by correcting its shape by inserting a support member. After the shape of the claw is corrected, the rear cover is assembled to the base portion so that the corrected anti-reverse claw is engaged with the winding dial to prevent reverse rotation.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
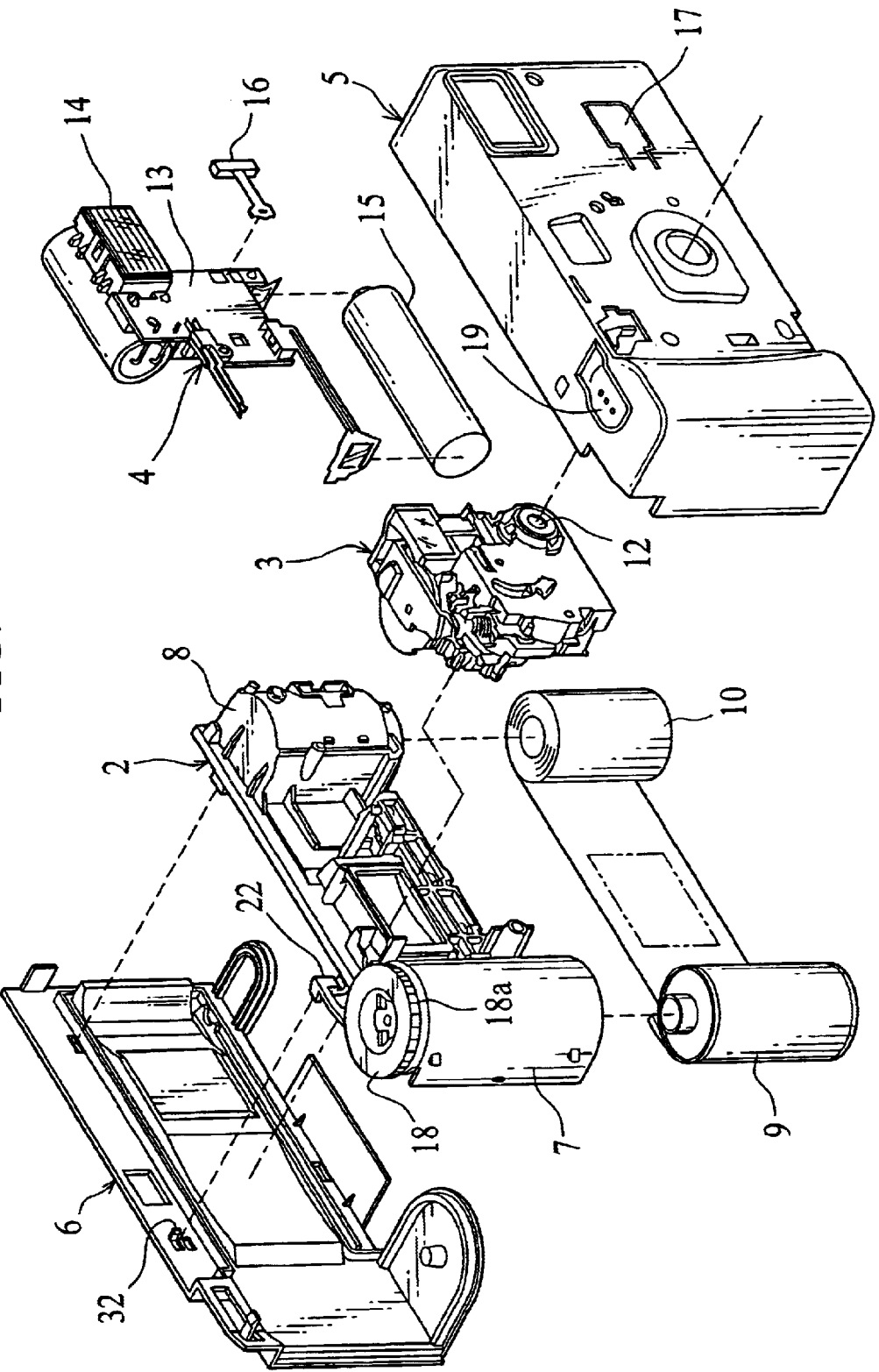
FIG. 1 is an exploded view in front perspective of a lens-fitted photo film unit of the present invention.

In FIG. 1, a lens-fitted photo film unit of the present invention includes a base portion 2, an exposure unit 3, a flash unit 4, a front cover 5 and a rear cover 6. The exposure unit 3 and the flash unit 4 are assembled to a front side of the base portion 2. The front and the rear covers 5, 6 are engaged with each other so as to cover the base portion 2. The base portion 2 has a film cartridge chamber 7 for containing a film cartridge 9. The base portion 2 includes a film roll chamber 8 for containing rolled ISO-135 photo film 10. It is possible to use IX240 photo film.

The exposure unit 3 has a taking lens 3, a viewfinder lens, a shutter mechanism including a shutter lever, a shutter charge mechanism including a sprocket that rotates in accordance with film winding operation, an anti-winding mechanism having a anti-winding lever, a film counter mechanism. The exposure unit 3 is assembled to the base portion 2 through an engaging claw and a positioning pin.

The flash unit 4 includes a printed circuit board 13 that mounts electronic components for comprising a flash circuit, a flash projector 14, a synchronizing switch that is turned on to synchronous the shutter release operation, a battery holder to bold a battery 15. The flash projector 14 has a flash discharging tube, a reflector and a protector. A switch plate 16 is disposed in front of the film roll chamber 8, and turned on to activate the flash circuit when a flash charging button 17 is pressed. The exposure unit 3 and the flash unit 4 are separated from the lens-fitted photo film unit after use, and reused after examination and repair processes.

A rotatable winding dial 18, which has a fork on the bottom engaged with a spool of the film cartridge 9, is assembled to the top of the film cartridge chamber 7. The photo film 10 has perforations that are engaged with the sprocket. When the winding dial 18 is rotated in the counterclockwise direction (film-winding direction) in FIG. 1, the sprocket is also rotated to wind the photo film 10. After the photo film 10 is wound by one frame, the anti-winding lever is in mesh with the teeth of the winding dial 18 to prevent it from rotating.

When the shutter button 19, integrated with the front cover 5, is pressed down, the shutter mechanism is actuated to open and close the shutter blade, so that photography is carried out. Then, the anti-winding lever moves to a position to release the winding dial 18, so that it is possible to repeat the film-winding operation and photography in the same manner. The photo film 10 is pulled frame by frame from the film roll chamber 8, and exposed frame is wound to the film cartridge 9.

Figure 2:
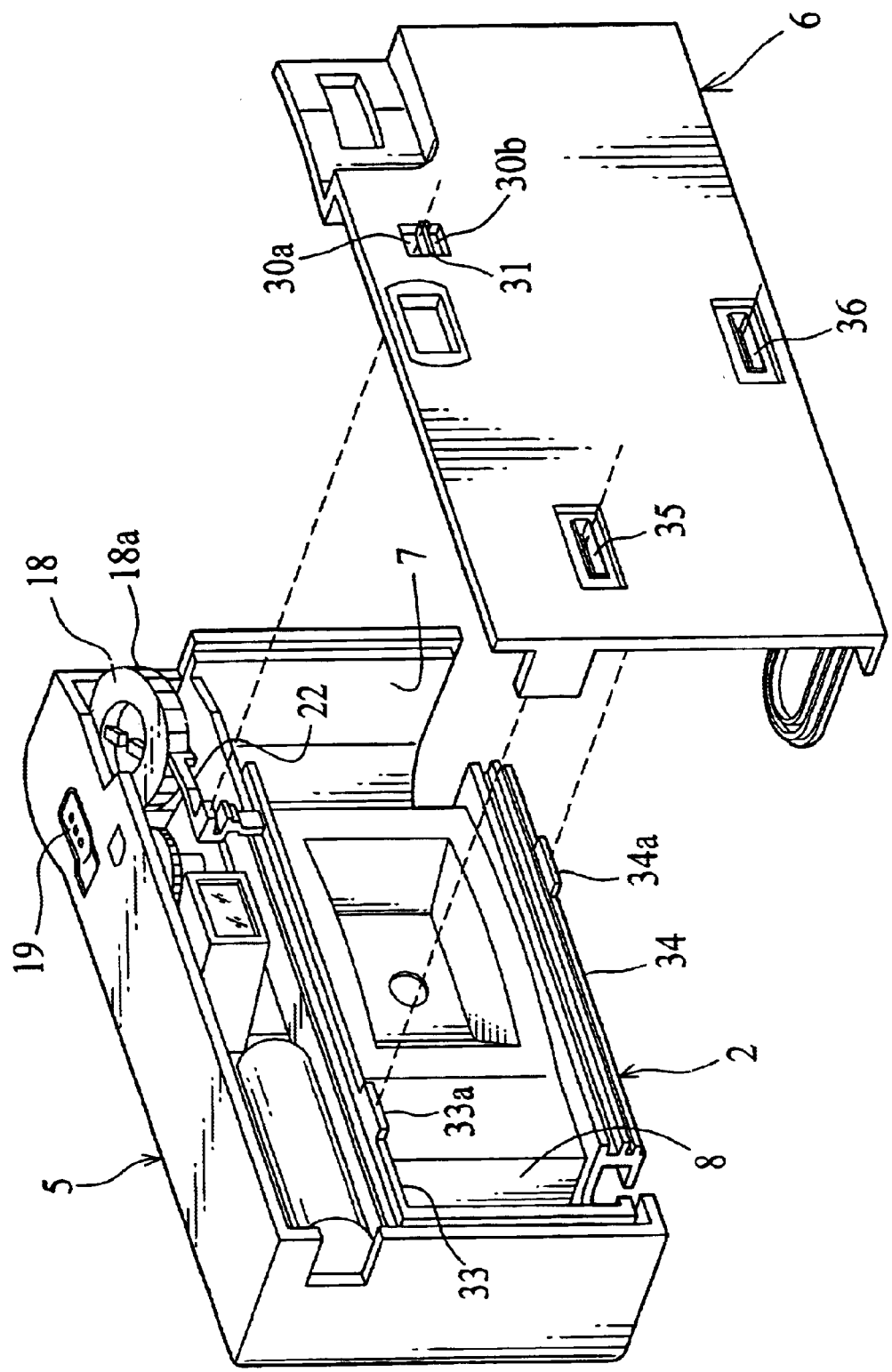
FIG. 2 is an exploded view in rear perspective of the lens-fitted photo film unit.

The base portion 2 has an anti-reverse claw 22 to prevent the winding dial 18 from rotating to the direction opposite to the film-winding direction. As shown in FIG. 2, a fulcrum portion of the anti-reverse claw 22 is integrated with the base portion 2, and one end of the anti-reverse claw 22 is resiliently in mesh from behind with the teeth 18a of the winding dial 18. Although the other end of the anti-reverse claw 22 is depicted as the fulcrum portion, the position of the fulcrum portion is not limited to the other end of the anti-reverse claw 22. In addition, it is possible to provide another teeth array on the bottom side of the winding dial 18 along the winding direction, and to engage the anti-reverse claw 22 with the teeth array.

Figure 3:
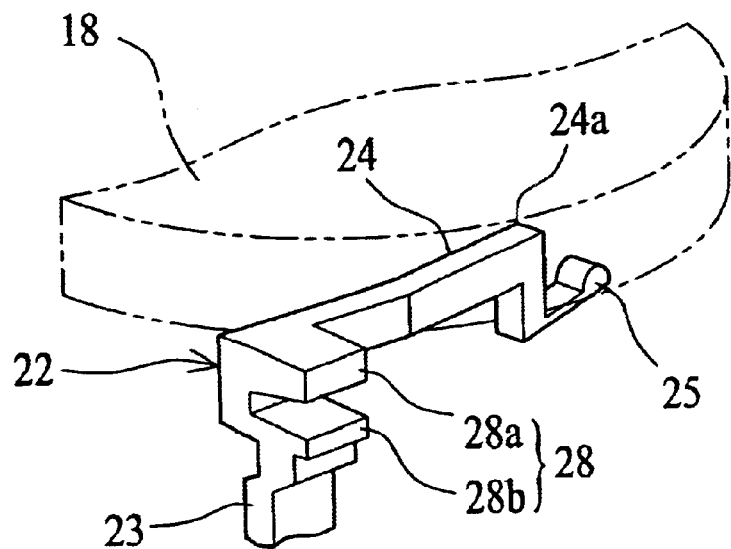
FIG. 3 is a perspective view of an anti-reverse claw.
Figure 4:
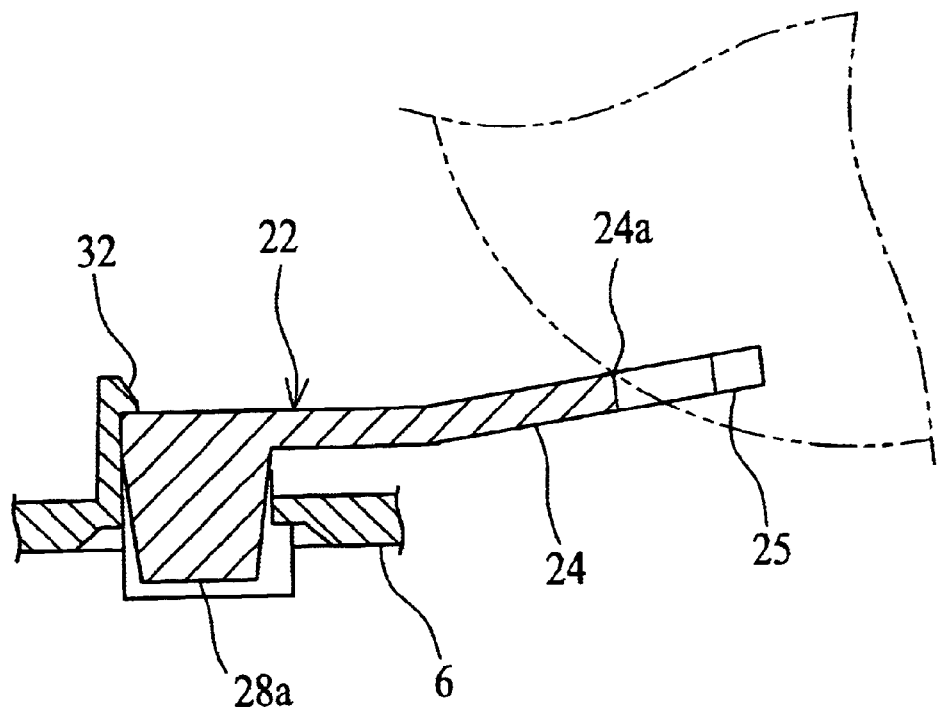
FIG. 4 is a fragmentary sectional view of the anti-reverse claw.

In FIGS. 3 and 4, the anti-reverse claw 22 has a support portion 23 and an engaging portion 24. The support portion 23 is extended upward from the base portion 2, and the engaging portion 24 is extended toward the winding dial 18 from the support portion 23. The engaging portion 24 has an edge 24a that engages the teeth 18a of the winding dial 18 to prevent reverse rotation of the winding dial 18. A noise-reduction plate 25 is provided integrally with the edge 24a of the engaging portion 24. During the winding operation, the edge 24a of the engaging portion 24 goes over the teeth 18a to make click noise. The noise-reduction plate 25 comes in contact with the bottom surface of the winding dial 18, so that the vibration of the engaging plate 24 is decreased during winding operation. Thus, the click noise made during the winding operation is decreased.

Figure 5:
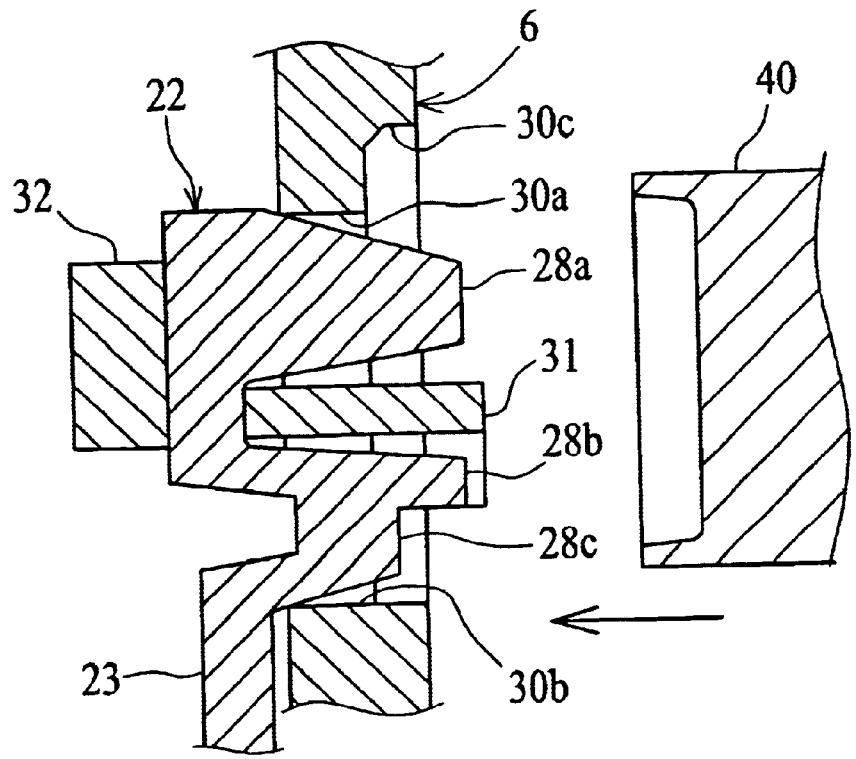
FIG. 5 is an explanatory view illustrating a process to weld the anti-reverse claw.

The support plate 23 has a welded portion 28 with a U-shape cross section. The welded portion 28 is consisted of a pair of welded pieces 28a, 28b. As shown in FIG. 5, the welded pieces 28a, 28b protrudes rearward through a pair of holes 30a, 30b on the rear cover 5, when the base portion 2 is covered by the rear cover 6. A separation plate 31 between the holes 30a, 30b goes into the space provided between the welded pieces 28a, 28b. A hook 32, formed on the inner surface of the rear cover 6, engages the front side of the welded portion 28, so that the welded portion 28 is fixed to a space between the inner surface of the rear cover 6 and the hook 32. Thus, the anti-reverse claw 22 is positioned, and the edge 24a of the engaging plate 24 is properly engaged with the teeth 18a of the winding dial 18.

In FIG. 2, the base portion 2 has light-shielding ribs that fit into grooves formed on the inner surface of the rear cover 6, so that the ambient light does not go inside through the joined surfaces between the base portion 2 and the rear cover 6. Two of the light-shielding ribs 33, 34 have welded pieces 33a, 34a that extend toward the rear cover 6. When the rear cover 6 covers the base portion 2, the welded pieces 33a, 34a extend behind the rear cover 6 through holes 35, 36 in the rear cover 6.

The welded pieces 28a, 28b, 33a, 34a, extended behind the rear cover 6 through the corresponding holes, are utilized for instant welding process by use of a welding head 40. The welding head 40 has nichrome wires in which electric current is conducted to melt the plastic materials. It is possible to use a high-frequency welder to melt the plastic materials by applying high-frequency electric field thereto.

In FIG. 5, the welding head 40 presses the welded pieces 28a, 28b and a step 28c. Then, the welding head 40 applied the heat momentarily to the welding pieces 28a, 28b, step 28c and the separation plate 31. While the welding portion 28 is pressed by the welding head 40, the hook 32 of the rear cover 6 holds the welding portion 28 to prevent the anti-reverse claw 22 from moving from the assembled position. Thus, there is no deviation in the position of the edge 24a of the engaging portion 24 and the teeth 18a of the winding dial 18.

Figure 6:
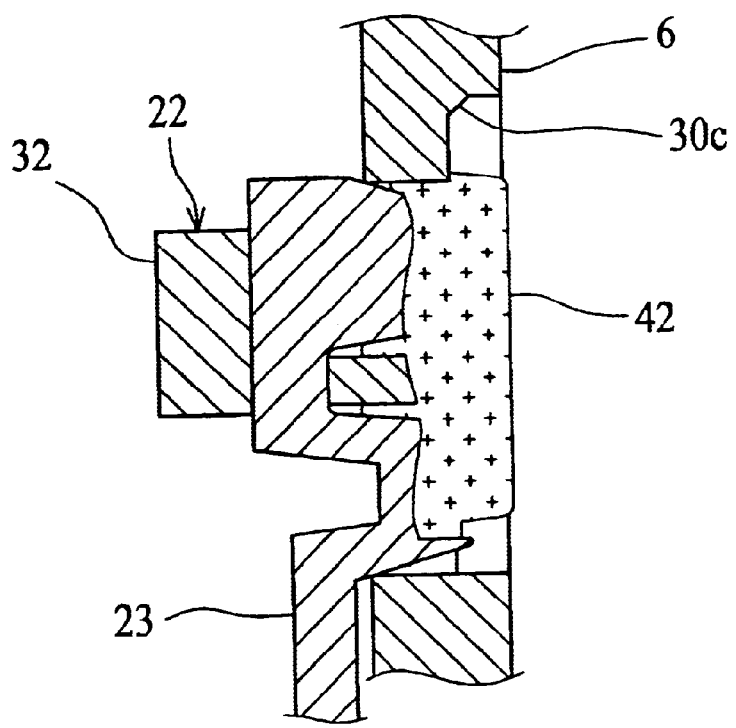
FIG. 6 is a fragmentary sectional view of the welded anti-reverse claw.

Then, as shown in FIG. 6, the welded pieces 28a, 28b, step 28c and the separation plate 31 are melted and mixed together. After they become solid, the welded portion 28 is firmly fixed to the rear cover 6. A recess 30c is provided in the rear surface of the rear cover 6 so as to surround the holes 30a, 30b. Since the welded portion 42 is spread in the recess 30c, the welded portion 42 does not project rearwards so much as the original welded pieces 28a, 28b.

Figure 7:
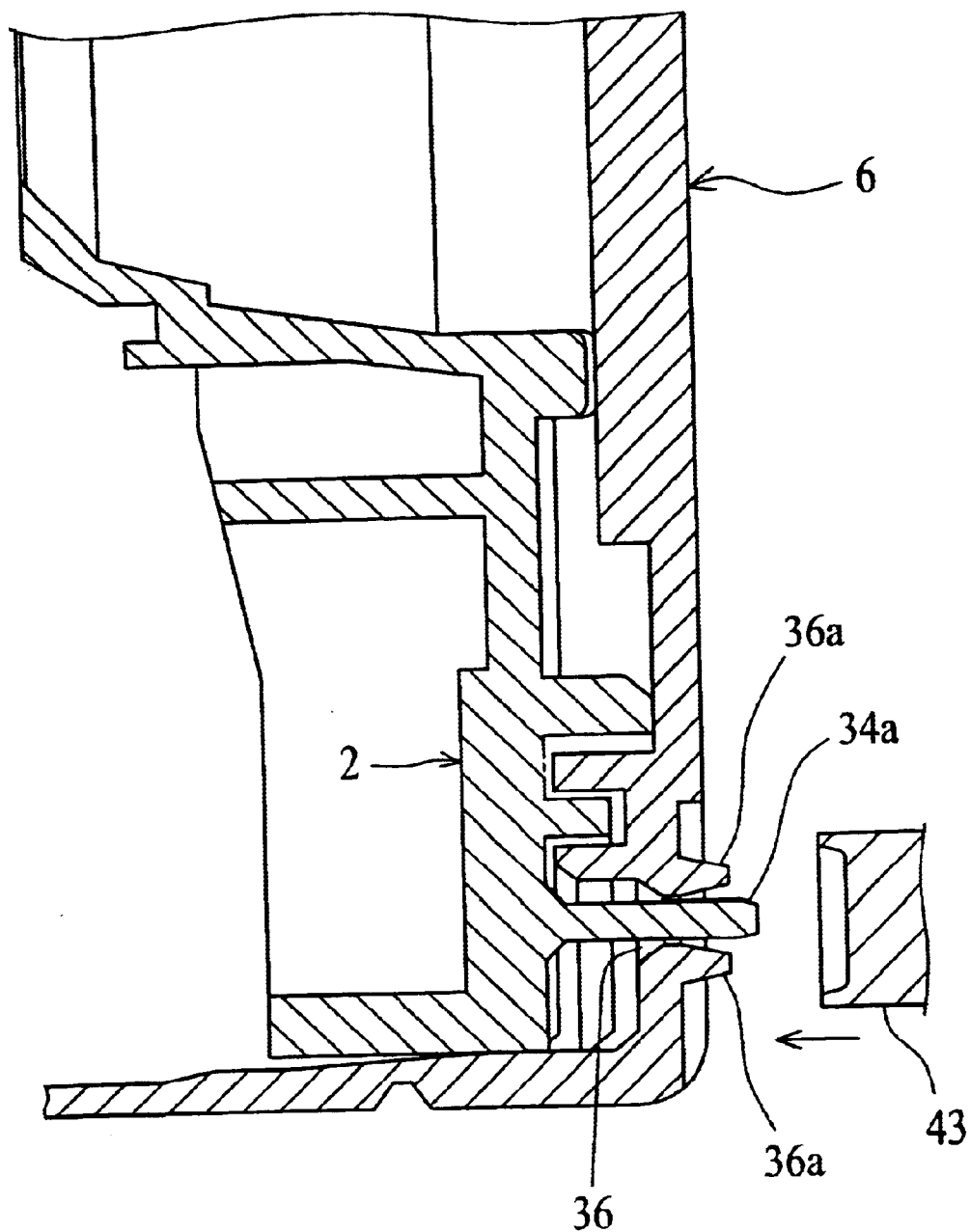
FIG. 7 is an explanatory view of a process to weld a protruded piece of a light-shielding rib.

In FIG. 7, the welded piece 34a of the light-shielding rib 34 projects rearward through the opening 36 formed in the rear cover 6. In the same manner above, the welded piece 34a is integrated with the rear cover 6 by the welding head 43. The rear cover 6 has a welding piece 36a projecting rearward so as to surround the opening 36. In the welding process, the welded pieces 34a, 36a are melted and mixed together, and then become solid to fix the rear cover 6 firmly to the base portion 2. In the same manner, the other welded piece 33a is welded to the rear cover 6. In addition to the momentary welding process, the base portion 2 and the rear cover 6 are connected to each other mechanically by the claw engagement. Moreover, ultrasonic welding is performed in the engaged portion between the light-shielding ribs and the grooves to fix the rear cover 6 to the base portion 2.

By connecting the rear cover 6 to the base portion 2 by the method described above, it is difficult to separate the rear cover 6 from the base portion 2 for improper cartridge replacement. Since the welding pieces are welded and mixed with the rear cover 6, the welded portions of the base portion 2 are broken when the rear cover 6 is forcibly separated from the base portion 2. In case of cutting the welded portion to avoid the breakage by use of a machine tool such as an ultrasonic cutter or a fraise, it causes much trouble to shield the chopped portion in light-tight manner after the film replacement. Moreover, as described below, such process causes the loss of the anti-reverse function of the anti-reverse claw 22.

The strength of the welded portion 28 is larger than the strength of the support portion 23 of the anti-reverse claw 22. Thus, if the rear cover 6 is forcibly separated after releasing the mechanical engagement and cutting the ultrasonically welded portions, the anti-reverse claw 22 is resiliently deformed. Then, the anti-reverse claw 22 is separated from the base portion 2 while stuck to the rear cover 6. This separated anti-reverse claw 22 can not be reused because of lack of the elasticity needed for anti-reverse function. If the welded portion 28 is cut away by use of a machine tool, the support portion 23 gets thinner because the step 28c, shown in FIG. 5, is cut away. Thus, the anti-reverse claw 22 gets weaker and loses its elasticity.

As described above, since the welded portion 28 of the anti-reverse claw 22 is integrated with the rear cover 6 by the welding process, it is difficult to separate the rear cover 6 from the base portion 2. Moreover, if the rear cover 6 is forcibly separated, the anti-reverse claw 22 loses its original function to prevent the reverse rotation of the winding dial 18. Accordingly, the present invention is effective in preventing improper cartridge exchange.

In addition, the welded piece 33a, 34a are welded and integrated with the rear cover 6, so the light-shielding ribs 33, 34 are partially deformed or broken if the rear cover 6 is forcibly separated. It is difficult to reuse the base portion with such light-shielding ribs. Cutting the welded portion causes a large hole in the rear cover 6, so it is difficult to reuse such rear cover 6 because of lack of light-shielding characteristics.

Figure 8:
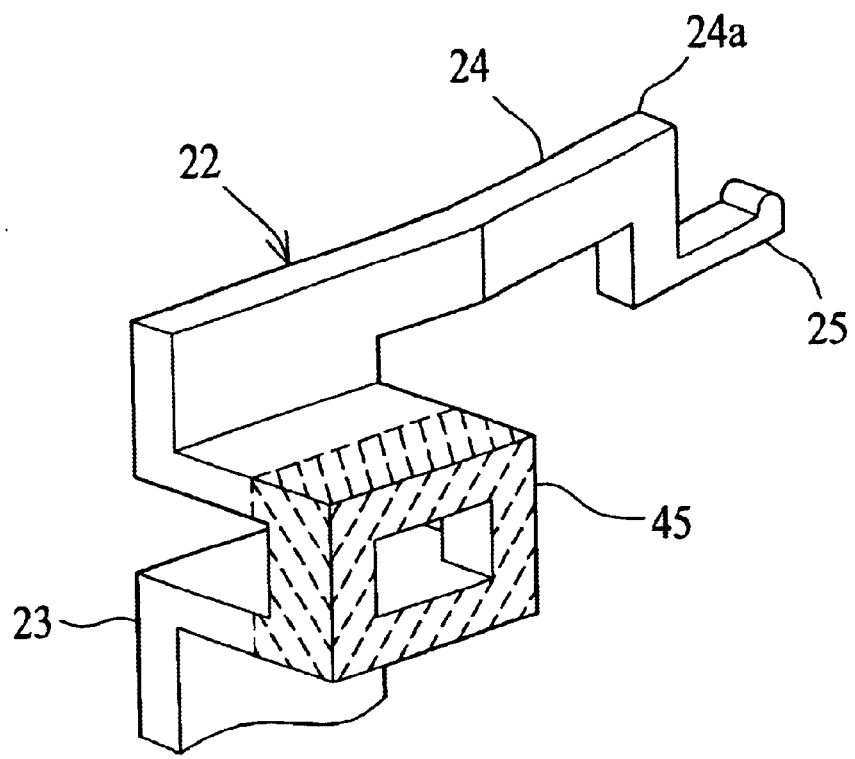
FIG. 8 is a perspective view of another embodiment of the anti-reverse claw.

Another embodiment of the anti-reverse claw 22 is illustrated in FIG. 8. The support portion 23 has a welded portion 45, shown as a hatched portion with dotted line, that has a rectangular frame shape and projects toward the rear cover 6. In assembling, the welded portion 45 goes through the opening formed in the rear cover 6, and is melted and fixed to the rear cover 6. Since the anti-reverse claw 22 is firmly fixed to the rear cover, it is possible to prevent the lens-fitted photo film unit from being reused.

Figure 9:
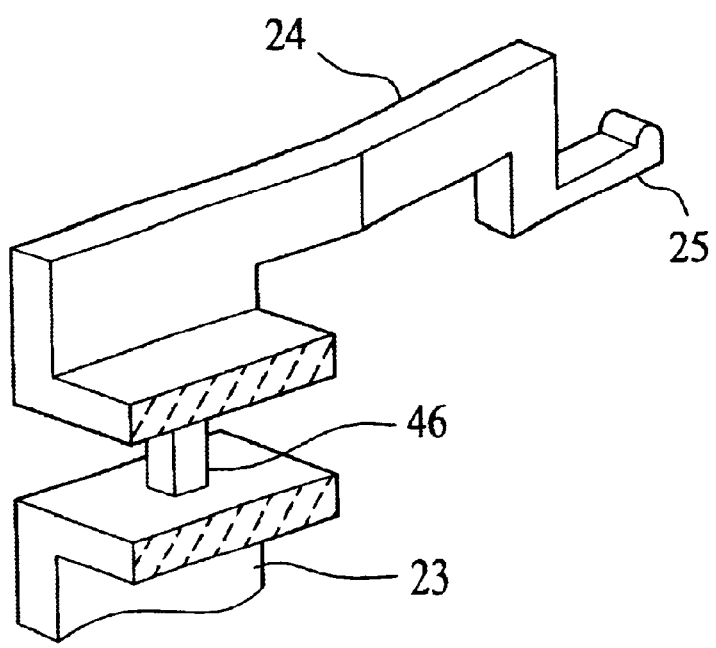
FIG. 9 is a perspective view of the anti-reverse claw of FIG. 8 in which a welded portion is removed.

When the welded portion 45 is cut away by use of a machine tool, a connection 46 between the engaging plate 24 and the support plate 23 becomes thinner, as shown in FIG. 9. Since the connection 46 is mechanically weak and does not have sufficient elasticity for anti-reverse function, the anti-reverse claw 22 can not be reused after cartridge exchange. The connection 46 may be omitted. In that case, the anti-reverse claw 22 is completely separated into two pieces after the welded portion 45 is cut away, so that the anti-reverse claw 22 can not be reused.

Figure 10:
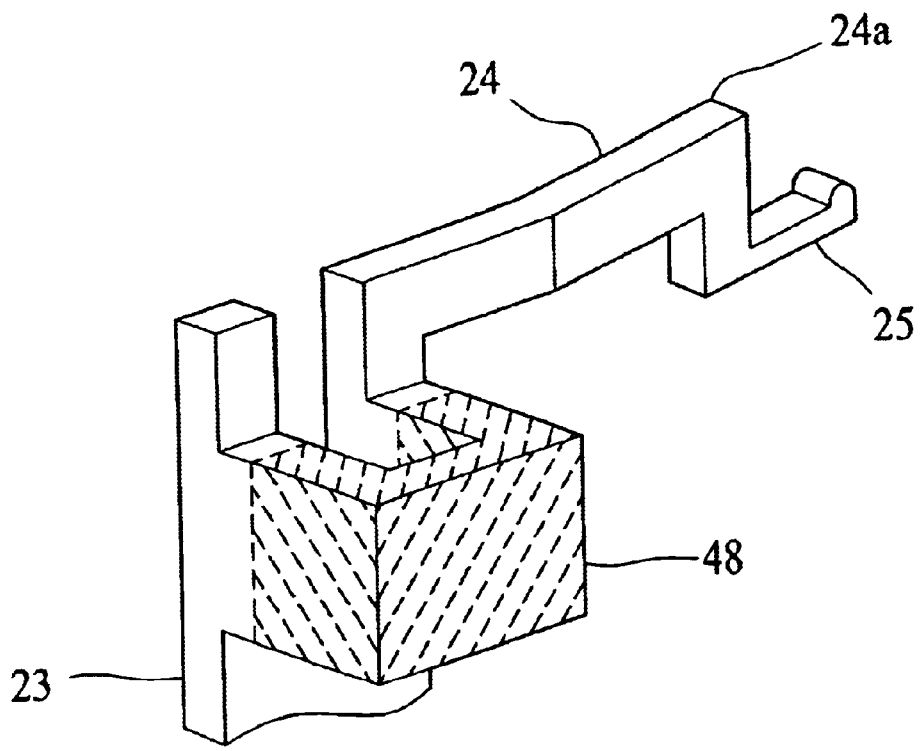
FIG. 10 is a perspective view of further embodiment of the anti-reverse claw.
Figure 11:
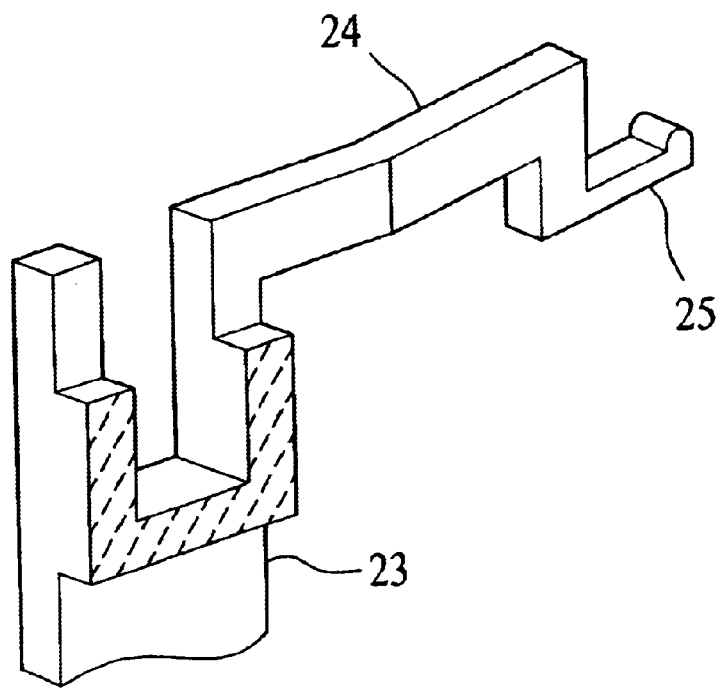
FIG. 11 is a perspective view of the anti-reverse claw of FIG. 10 in which the welded portion is removed.

A further embodiment of the present invention is depicted in FIG. 10. A welded portion 48, shown as a hatched portion with dotted lines, projects rearward through the opening in the rear cover 6. By welding the welded portion 48, the anti-reverse claw 22 is firmly fixed to the rear cover 6 to prevent improper reuse. If the welded portion 48 is cut away, the shape of the anti-reverse claw 22 is changed so that the base of the engaging portion becomes weaker, as shown in FIG. 11. The anti-reverse claw 22 is easily broken in the reverse rotation of the winding dial 18.

Figure 12:
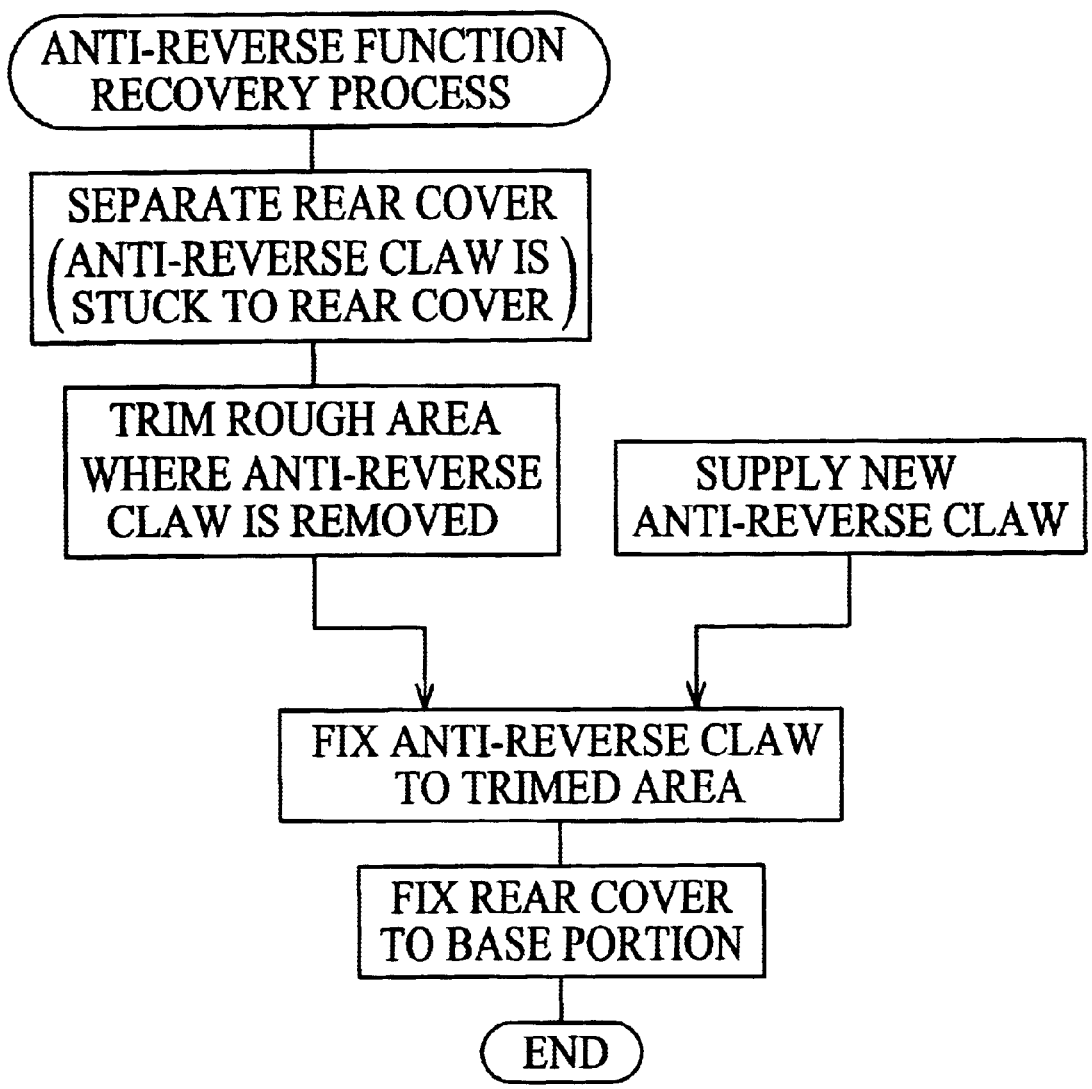
FIG. 12 is a flow chart of a process to put the anti-reverse mechanism to the lens-fitted photo film unit after a rear cover is removed.

The lens-fitted photo film, collected properly, is subject to the recycle process in which the base portion 2, the front cover 5 and the rear cover 6 are crushed, and melted and palletized if necessary. It is preferable for reducing the manufacturing cost, however, to reuse the base portion 2. Thus, the anti-reverse function recovery process, shown in FIG. 12, is carried out to reuse the base portion 2 that loses its anti-reverse function after removal of the rear cover 6.

A used lens-fitted photo film unit is collected, and the front cover 5 is removed to separate the exposure unit 3 and flash unit 4. These units 3, 4 are subject to the function examination process and the repair process, and assembled to a new lens-fitted photo film unit. Since the used front cover 5 usually has flaws and dusts on its surface, the front cover 5 is crushed, and pelletized for recycle, if necessary.

Figure 13:
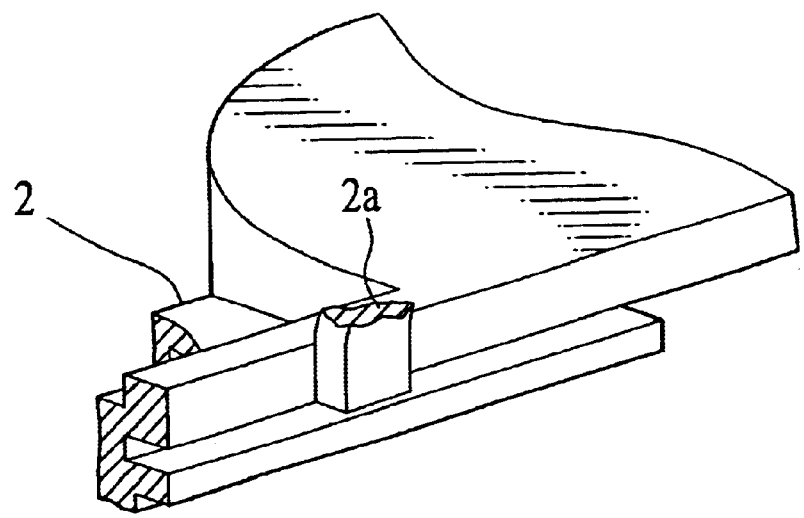
FIG. 13 is a fragmentary sectional view showing a base portion without the anti-reverse claw.

Then, the rear cover 6 is separated from the base portion 2. In separation, the welded portion of the welded pieces 33a, 34a are cut away along predetermined line by an ultrasonic cutter. Although the base portion 2 is partially removed, the base portion 2 has a complete light-shielding function by putting additional light-shielding parts. The anti-reverse claw 22, integrated with the rear cover 6, is separated from the base portion 2. In FIG. 13, the base portion 2 has a rough surface 2a because of the separation of the anti-reverse claw 22. The portion with the rough surface 2a is cut away, and the section is smoothed as shown in FIG. 14.

A new anti-reverse claw 50 is prepared, and fixed to the smoothed area of the base portion 2. The anti-reverse claw 22 has a pair of positioning projection 51a to fit the smoothed portion of the base portion 2. A recess 51b is formed in the anti-reverse claw 50 to fit the anti-reverse claw 50 to the step of the base portion 2. The anti-reverse claw 50 is fixed to the base portion 2 by mechanical engagement by use of the claws, and by ultrasonic welding process. In addition to smooth the rough surface, it is possible to form an engaging portion or holes for positioning the anti-reverse claw. It is possible to fix a new anti-reverse claw to the rear cover 6 instead of base portion 2. In that case, the old anti-reverse claw is removed from the rear cover 6, and the jointed surface of the rear cover 6 is smoothed. Then, a new anti-reverse claw is fixed to the corresponding portion of the rear cover 6.

The old anti-reverse claw 22 can be integrated with a new welded portion 28 to form the new anti-reverse claw 50. In that case, the welded portion of the new anti-reverse claw goes rearward through an opening of a new rear cover. It is possible to prevent the improper cartridge exchange by welding the welded portion to the rear cover.

Figure 14:
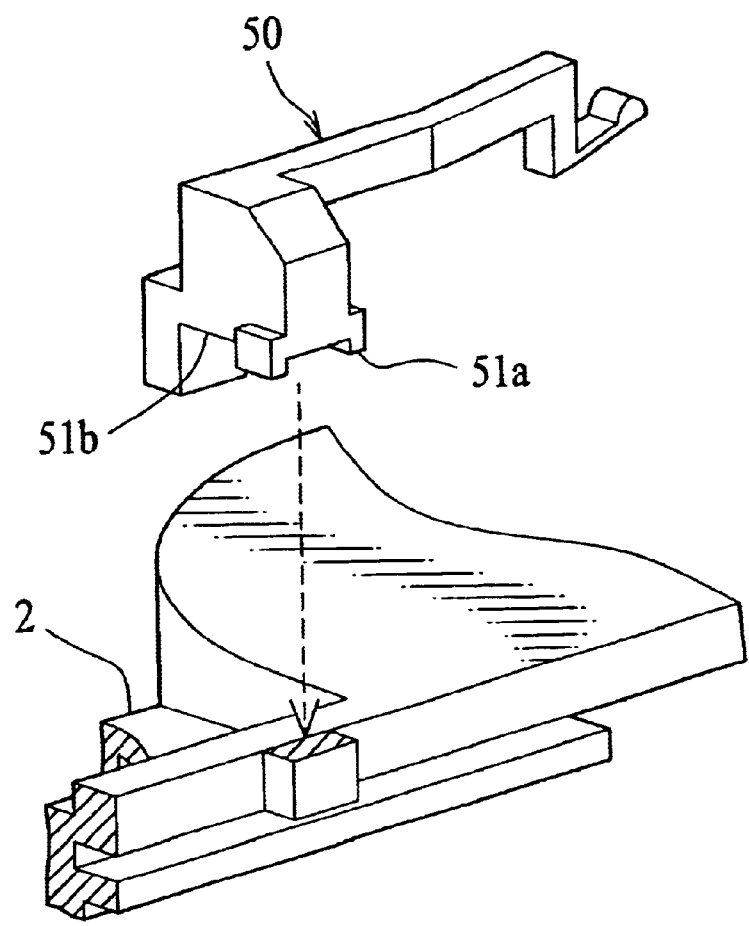
FIG. 14 illustrates a process to assemble a new anti-reverse claw into the base portion.

The rear cover 6 may be reused by using a new anti-reverse claw with a welded portion that does not protrude rearward, as shown in FIG. 14. Fixing to the base portion 2, the new anti-reverse claw can prevent the reverse rotation of the winding dial 18. After removal of the old anti-reverse claw, stuck on the rear cover 6, the rough surface of the rear cover 6 is smoothed so that the rear cover 6 does not interrupt the movement of the anti-reverse claw. After the above process, the rear cover 6 is assembled to the rear side of the base portion 2, the ultrasonic welding or momentary welding is performed to the jointed portion between the rear cover 6 and the anti-reverse claw.

Figure 15:
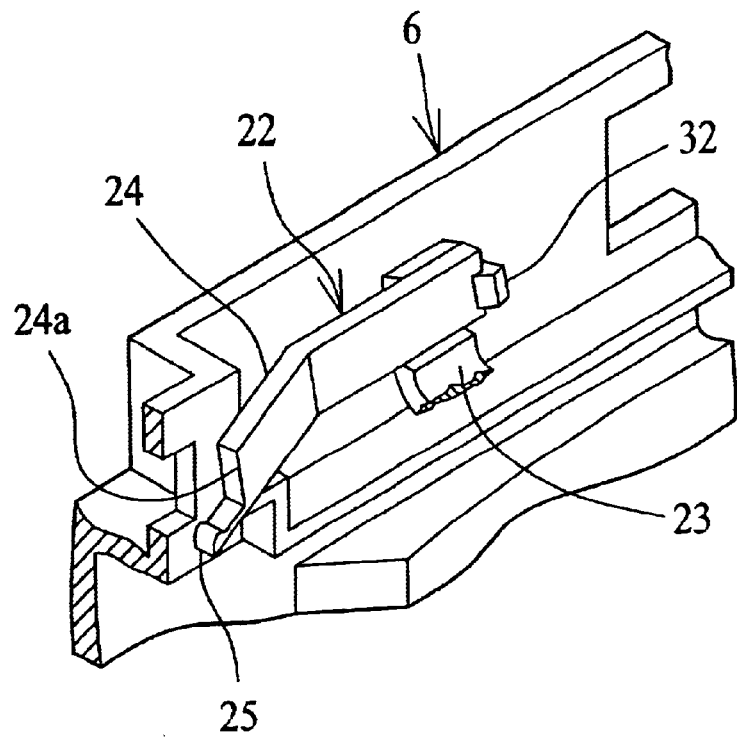
FIG. 15 is a fragmentary sectional view of the anti-reverse claw rear cover stuck to the rear cover.
Figure 16:
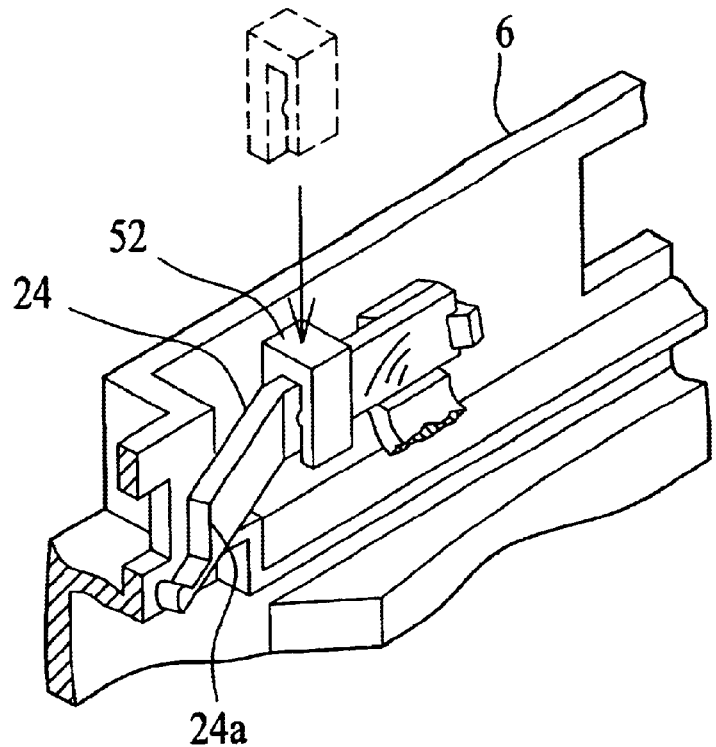
FIG. 16 is an explanatory view of a process to reuse the anti-reverse claw on the rear cover.

It is also possible to reuse the rear cover 6 with the used anti-reverse claw 22 stuck thereon after separation from the base portion 2. In FIG. 15, the engaging plate 24 of the anti-reverse claw 22 is deformed so that the edge 24a is tilted to lose its anti-reverse function. Thus, a support plate 52 is inserted between the rear cover 6 and the anti-reverse claw 22. The support plate 52 may be stuck on the rear cover 6, and correct the shape of the engaging plate 24. When the rear cover 6 is properly assembled to the base portion 2, the anti-reverse claw 22, fixed firmly to the rear cover 6, has its original anti-reverse function.

Since the anti-reverse claw, corrected its shape in that way, is originally separated from the base portion 2, the anti-reverse claw does not lose its anti-reverse function if the rear cover is separated again. In the separation of the rear cover, however, it is needed to cut other welded portions between the base portion and the rear cover. Thus, the remanufactured lens-fitted photo film unit may not be sol in the market, because the appearance and the light-shielding characteristic of the lens-fitted photo film unit are damaged.

The present invention is not to be limited to the above embodiment but, on the contrary, various modifications will be possible to those skilled in the art without departing from the scope of claims appended hereto.

What is claimed is:

1. A lens-fitted photo film unit having a base portion to support a photography mechanism, a rear cover assembled to the rear side of said base portion, a winding dial that rotates in a regular direction in winding a photo filmstrip, said lens-fitted photo film unit comprising:
   an anti-reverse claw integrated with said base portion, said anti-reverse claw being engaged with said winding dial to prevent said winding dial from being rotated in a reverse direction opposite to said regular direction; and
   a welded portion integrated with said anti-reverse claw, said welded portion being welded to said rear cover;
   wherein said welded portion protrudes rearward of said rear cover through an opening formed in said rear cover.

2. A film unit as claimed in claim 1, wherein protruded portion of said welded portion is welded to said rear cover.

3. A film unit as claimed in claim 2, wherein said welded portion has at least two welded pieces separated, said rear cover has at least one separation plate to divide said opening of said rear cover into at least two small openings, said welded piece going through corresponding said small opening and being welded to said rear cover together with said separation plate.

4. A film unit as claimed in claim 2, wherein said welded portion has a U-shaped cross section.

5. A film unit as claimed in claim 2, wherein said opening of said rear cover is surrounded by a recess formed on a rear surface of said rear cover, said welded portion being melted and spread in said recess.

6. A film unit as claimed in claim 1, wherein said anti-reverse claw has an edge portion and a support portion, said edge portion being engaged with said winding dial, said support portion connecting said anti-reverse claw to said base portion, said welded portion being provided in an area closer to said support portion than said edge portion.

7. A film unit as claimed in claim 1, wherein said rear cover has an engaging claw to hold said anti-reverse claw between said rear cover and said engaging claw.

8. A film unit as claimed in claim 1, further comprising:
   at least one light-shielding rib integrated with the rear side of said base portion, said light-shielding rib having a second welded portion that goes through a second opening formed in said rear cover, said second welded portion being welded to said rear cover assembled to said base portion so as to connect said light-shielding rib to said base portion.

9. A method for reusing a lens-fitted photo film unit including a rear cover that is assembled to the rear side of a base portion to support a photography mechanism, an anti-reverse claw that is integrated with said base portion and welded to said rear cover, said anti-reverse claw being engaged with a winding dial to prevent the reverse rotation of said winding dial, said method comprising steps of:
   separating said rear cover from said base portion of a used lens-fitted photo film unit; and
   welding a new anti-reverse claw to said lens-fitted photo film unit, whereby said new anti-reverse claw engages said winding dial to prevent the reverse rotation of said winding dial.

10. A method as claimed in claim 9, further comprising a step of smoothing a rough surface of said base portion formed by separating said anti-reverse claw from said base portion.

11. A method as claimed in claim 10, further comprising a step of welding said new anti-reverse claw to the smoothed surface of said base portion.

12. (original): A method as claimed in claim 10, further comprising steps of:
   removing said anti-reverse claw from said rear cover;
   smoothing s rough surface of said rear cover formed by removing said anti-reverse claw from said rear cover; and
   welding a new anti-reverse claw to said base portion and said rear cover.

13. A method as claimed in claim 10, wherein said new anti-reverse claw has a positioning member that fits the smoothed surface of said base portion.

14. A method for reusing a lens-fitted photo film unit including a rear cover that is assembled to the rear side of a base portion to support a photography mechanism, an anti-reverse claw that is integrated with said base portion and welded to said rear cover, said anti-reverse claw being engaged with a winding dial to prevent the reverse rotation of said winding dial, said method comprising steps of:
   separating said rear cover together with said anti-reverse claw from said base portion of a used lens-fitted photo film unit;
   correcting the deformation of said anti-reverse claw stuck on said rear cover; and
   assembling said rear cover with said corrected anti-reverse claw to said base portion, whereby said corrected anti-reverse claw engages said winding dial to prevent the reverse rotation of said winding dial.

15. A method as claimed in claim 14, further comprising a step of attaching a support member to said anti-reverse claw on said rear cover to retain said anti-reverse claw at the corrected position.

16. A claw member used in reusing a lens-fitted photo film including a rear cover that is assembled to the rear side of a base portion to support a photography mechanism, an anti-reverse claw that is integrated with said base portion and welded to said rear cover, said anti-reverse claw being engaged with a winding dial to prevent the reverse rotation of said winding dial, said anti-reverse claw being stuck on said rear cover after said rear cover is separated from said base portion, said claw member being fixed to said base portion or said rear cover, whereby said claw member is engaged with said winding dial to prevent the reverse rotation of said winding dial.

* * * * *